(12) United States Patent
Kermiche et al.

(10) Patent No.: US 8,934,192 B1
(45) Date of Patent: Jan. 13, 2015

(54) DISK DRIVE DETERMINING OPERATING FLY HEIGHT BY DETECTING HEAD DISK CONTACT FROM READ SIGNAL AMPLITUDE VARIANCE

(75) Inventors: Noureddine Kermiche, Mission Viejo, CA (US); Scott A. St. John, Trabuco Canyon, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 1280 days.

(21) Appl. No.: 12/277,142

(22) Filed: Nov. 24, 2008

(51) Int. Cl.
*G11B 5/55* (2006.01)

(52) U.S. Cl.
USPC ..................................... 360/78.01

(58) Field of Classification Search
None
See application file for complete search history.

(56) References Cited

U.S. PATENT DOCUMENTS

| | | |
|---|---|---|
| 5,130,866 A | 7/1992 | Klaassen et al. |
| 5,297,131 A | 3/1994 | Tanaka |
| 5,589,996 A | 12/1996 | Patrick et al. |
| 5,594,595 A | 1/1997 | Zhu |
| 5,691,857 A | 11/1997 | Fitzpatrick et al. |
| 5,742,446 A | 4/1998 | Tian et al. |
| 5,751,512 A | 5/1998 | Anderson |
| 5,761,165 A | 6/1998 | Takeda et al. |
| 5,926,338 A | 7/1999 | Jeon et al. |
| 5,978,168 A | 11/1999 | Mathews et al. |
| 5,991,115 A | 11/1999 | Chainer et al. |
| 5,998,994 A | 12/1999 | Mori |
| 6,008,640 A | 12/1999 | Tan et al. |
| 6,008,962 A | 12/1999 | Le et al. |
| 6,014,283 A | 1/2000 | Codilian et al. |
| 6,052,243 A | 4/2000 | Shimada |
| 6,061,201 A | 5/2000 | Woods |
| 6,067,205 A | 5/2000 | Mathews et al. |
| 6,094,318 A * | 7/2000 | Kim ............................ 360/60 |
| 6,097,559 A | 8/2000 | Ottesen et al. |
| 6,191,901 B1 * | 2/2001 | Carlson et al. ............. 360/31 |
| 6,288,856 B1 | 9/2001 | Ottesen et al. |
| 6,310,740 B1 | 10/2001 | Dunbar et al. |
| 6,310,742 B1 | 10/2001 | Nazarian et al. |
| 6,317,285 B1 | 11/2001 | Bi et al. |
| 6,493,169 B1 | 12/2002 | Ferris et al. |
| 6,510,017 B1 | 1/2003 | Abdelnour |
| 6,568,252 B1 | 5/2003 | Boutaghou |
| 6,657,810 B1 | 12/2003 | Kupferman |
| 6,687,078 B1 | 2/2004 | Kim |
| 6,700,724 B2 | 3/2004 | Knippenberg et al. |
| 6,717,764 B2 | 4/2004 | Lake |
| 6,754,025 B1 | 6/2004 | Shepherd et al. |
| 6,754,030 B2 | 6/2004 | Seng et al. |
| 6,762,899 B2 | 7/2004 | Ottesen et al. |
| 6,785,081 B2 | 8/2004 | Chapin et al. |
| 6,798,605 B2 | 9/2004 | Kurita et al. |
| 6,801,376 B2 | 10/2004 | Smith |

(Continued)

Primary Examiner — K. Wong

(57) ABSTRACT

A disk drive is disclosed comprising a disk comprising a plurality of tracks, wherein each track comprises a plurality of data sectors and a plurality of servo sectors, and each servo sector comprises a plurality of servo bursts. The disk drive further comprises a head actuated radially over the disk, wherein the head comprises a dynamic fly height (DFH) actuator. A gain control circuit is operable to generate a gain control signal for adjusting an amplitude of a read signal emanating from the head. Control circuitry selects an operating control signal applied to the DFH actuator by positioning the head over one of the tracks, and measuring an amplitude signal in response to the read signal. An amplitude variance signal is computed in response to the amplitude signal, and whether the head has contacted the disk is detected in response to the amplitude variance signal.

24 Claims, 7 Drawing Sheets

(56) References Cited

U.S. PATENT DOCUMENTS

| | | | |
|---|---|---|---|
| 6,822,816 B2 | 11/2004 | Dakroub | |
| 6,847,503 B2 | 1/2005 | Zhang et al. | |
| 6,865,040 B2 | 3/2005 | Fayeulle et al. | |
| 6,906,878 B2 * | 6/2005 | Smith et al. | 360/31 |
| 6,914,740 B1 | 7/2005 | Tu et al. | |
| 6,947,248 B2 | 9/2005 | Allen et al. | |
| 6,950,267 B1 * | 9/2005 | Liu et al. | 360/75 |
| 6,972,540 B1 | 12/2005 | Wang et al. | |
| 6,972,919 B2 * | 12/2005 | Suk | 360/75 |
| 6,975,467 B1 * | 12/2005 | Lewkowicz et al. | 360/31 |
| 6,980,383 B2 | 12/2005 | Brunnett et al. | |
| 6,999,266 B1 | 2/2006 | Schmidt | |
| 7,016,131 B2 | 3/2006 | Liu et al. | |
| 7,038,875 B2 | 5/2006 | Lou et al. | |
| 7,046,463 B2 * | 5/2006 | Gay Sam et al. | 360/25 |
| 7,064,659 B2 | 6/2006 | Baumgartner et al. | |
| 7,068,451 B1 | 6/2006 | Wang et al. | |
| 7,068,457 B2 | 6/2006 | Riddering et al. | |
| 7,095,578 B2 | 8/2006 | Ma | |
| 7,099,108 B2 | 8/2006 | Zayas | |
| 7,121,133 B2 | 10/2006 | Chu et al. | |
| 7,124,625 B1 | 10/2006 | Kurita et al. | |
| 7,126,776 B1 | 10/2006 | Warren, Jr. et al. | |
| 7,136,248 B2 | 11/2006 | Tanner | |
| 7,139,149 B1 | 11/2006 | Sun et al. | |
| 7,158,325 B1 | 1/2007 | Hu et al. | |
| 7,180,692 B1 | 2/2007 | Che et al. | |
| 7,199,961 B1 | 4/2007 | Wu et al. | |
| 7,206,159 B2 | 4/2007 | White | |
| 7,212,374 B1 | 5/2007 | Wang et al | |
| 7,251,098 B1 | 7/2007 | Wang et al. | |
| 7,271,975 B2 * | 9/2007 | Shimizu et al. | 360/75 |
| 7,342,734 B1 | 3/2008 | Patapoutian et al. | |
| 7,349,170 B1 | 3/2008 | Rudman et al. | |
| 7,359,139 B1 | 4/2008 | Wu et al. | |
| 7,362,534 B1 | 4/2008 | Schreck et al. | |
| 7,551,390 B1 | 6/2009 | Wang et al. | |
| 7,583,466 B2 | 9/2009 | Kermiche et al. | |
| 2002/0054446 A1 | 5/2002 | Smith | |
| 2002/0063545 A1 | 5/2002 | Bloyer et al. | |
| 2002/0122267 A1 | 9/2002 | Morioka | |
| 2002/0167745 A1 | 11/2002 | Ottesen et al. | |
| 2003/0002183 A1 | 1/2003 | Fioravanti | |
| 2003/0184899 A1 | 10/2003 | Gay Sam et al. | |
| 2003/0193727 A1 | 10/2003 | Fioravanti et al. | |
| 2003/0218813 A1 | 11/2003 | Dakroub | |
| 2007/0047133 A1 | 3/2007 | Allen | |
| 2007/0127148 A1 | 6/2007 | Yokohata et al. | |
| 2007/0146920 A1 | 6/2007 | Kitamura et al. | |
| 2007/0188908 A1 | 8/2007 | Kurita et al. | |
| 2007/0291401 A1 | 12/2007 | Sun et al. | |

\* cited by examiner

AS = A+B+C+D

AS = A+B

DISK DRIVE DETERMINING OPERATING FLY HEIGHT BY DETECTING HEAD DISK CONTACT FROM READ SIGNAL AMPLITUDE VARIANCE

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

Because the disk is rotated at a constant angular velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1, which shows a prior art disk format 2 comprising a number of data tracks 4, wherein the data tracks are banded together in this example to form three physical zones from the inner diameter of the disk (ZONE 1) to the outer diameter of the disk (ZONE 3). The prior art disk format of FIG. 1 also comprises a number of servo sectors $6_0$-$6_N$ recorded around the circumference of each data track. Each servo sector 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

An air bearing forms between the head and the disk due to the disk rotating at high speeds. Since the quality of the write/read signal depends on the fly height of the head, conventional heads (e.g., magnetoresistive heads) may comprise an actuator for controlling the fly height. Any suitable fly height actuator may be employed, such as a heater which controls fly height through thermal expansion, or a piezoelectric (PZT) actuator. It is therefore desirable to determine the appropriate control signal applied to the actuator that achieves the target fly height for the head.

DETAILED DESCRIPTION OF EMBODIMENTS OF THE INVENTION

Figure 2A:
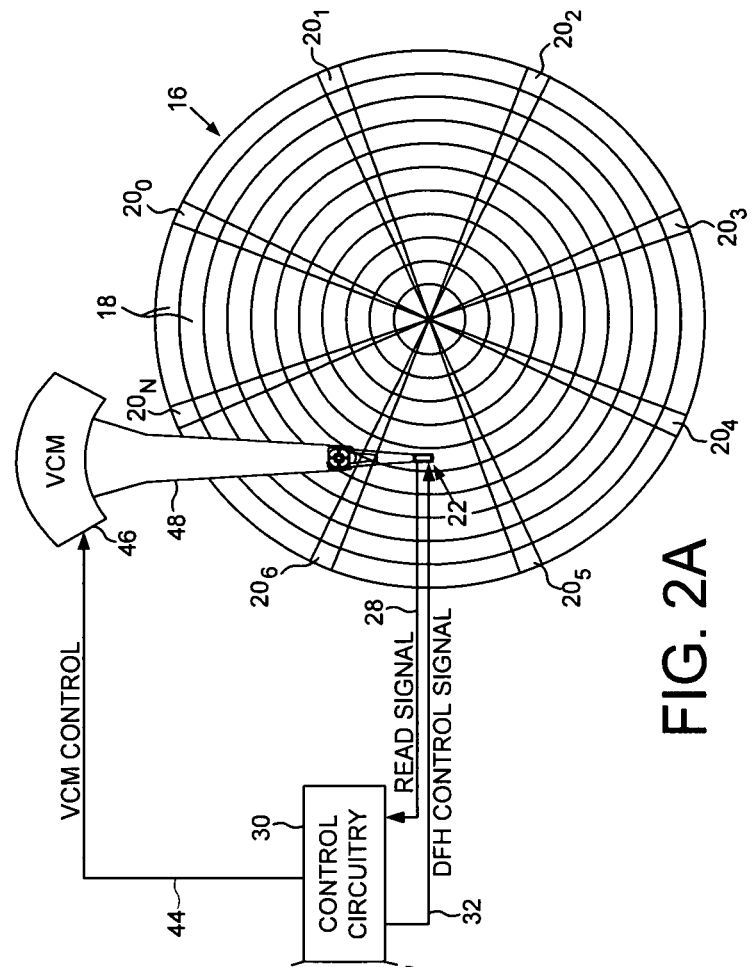
FIG. 2A shows a disk drive according to an embodiment of the present invention comprising a head actuated over a disk, and control circuitry for selecting an operating control signal applied to a dynamic fly height (DFH) actuator.

FIG. 2A shows a disk drive according to an embodiment of the present invention comprising a disk 16 having a plurality of tracks 18, wherein each track comprises a plurality of data sectors and a plurality of servo sectors $20_0$-$20_N$, and each servo sector comprises a plurality of servo bursts. The disk drive further comprises a head 22 actuated radially over the disk 16, wherein the head 22 comprises a dynamic fly height (DFH) actuator. A gain control circuit 24 (FIG. 4) is operable to generate a gain control signal 26 for adjusting an amplitude of a read signal 28 emanating from the head. Control circuitry 30 executes the flow diagram of FIG. 2B to select an operating control signal 32 applied to the DFH actuator by positioning the head 22 over one of the tracks 18 (step 34), and measuring an amplitude signal in response to the read signal 28 (step 36). The amplitude signal comprises at least one of 1) a sum of at least two of the servo bursts when the head 22 reads a servo sector from the disk; 2) the gain control signal 26 when the head 22 reads data from the disk 16; and 3) an amplitude of the read signal 28 when the head 22 reads a test pattern from the disk. An amplitude variance signal is computed in response to the amplitude signal (step 38), and whether the head has contacted the disk is detected in response to the amplitude variance signal (step 40).

In one embodiment, the amplitude variance signal is generated as the average of the square of the distance of each data point of a suitable signal from its mean:

$$\text{Var}(x) = \sum p_i(x_i - \mu)^2$$

where x represents discrete samples of the suitable signal, such as discrete samples of the amplitude signal (or discrete samples of a non-repeatable component of the amplitude signal as described below), µ is the mean of the signal, and p is a probability mass function of the signal. The amplitude variance signal computed according to the above equation provides a good indication of head/disk contact. The summation may be performed over any suitable number of samples to optimize the sensitivity (maximize the probability of accurately detecting the head/disk contact).

Figure 2B:
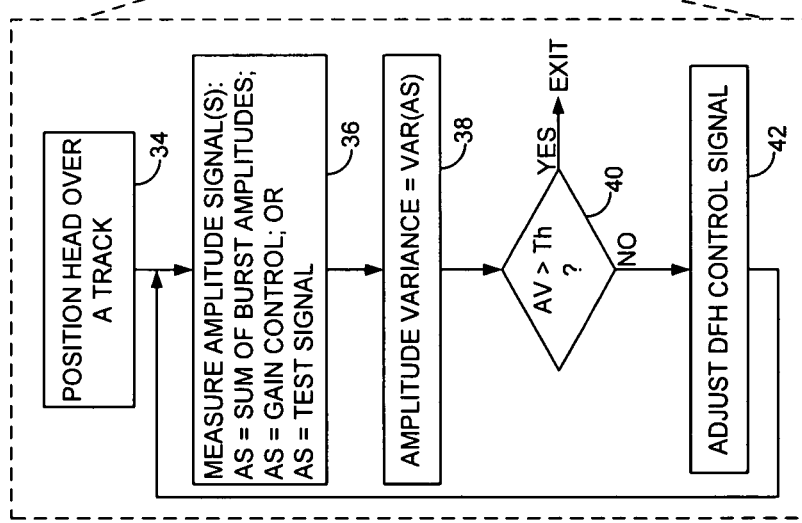
FIG. 2B is a flow diagram executed by the control circuitry according to an embodiment of the present invention wherein the DFH actuator control signal is selected by measuring an amplitude variance signal in response to an amplitude signal.

In the embodiment of FIG. 2B, detecting whether the head 22 has contacted the disk 16 comprises comparing the amplitude variance signal to a threshold (step 40). Any suitable threshold may be used, and in one embodiment, the threshold is calibrated for a family of disk drives by evaluating a subset of disk drives. In one embodiment, the control signal 32 applied to the DFH actuator is adjusted (step 42) when the amplitude variance signal does not exceed the threshold. The flow diagram of FIG. 2B is then re-executed (from step 36) and the control signal 32 adjusted until the amplitude variance signal exceeds the threshold (step 40) indicating that the head 22 has contacted the disk 16. In one embodiment, the operating control signal applied to the DFH actuator is then selected by subtracting a suitable margin from the setting that causes the head/disk contact.

In the embodiment of FIG. 2A, the control circuitry 30 processes the read signal 28 to demodulate the servo sectors $20_0$-$20_N$ into a position error signal (PES). The PES is filtered with a suitable compensation filter to generate a control signal 44 applied to a voice coil motor (VCM) 46 which rotates an actuator arm 48 about a pivot in order to position the head 22 radially over the disk 16 in a direction that reduces the PES. The servo sectors $20_0$-$20_N$ may comprise any suitable position information, such as a track address for coarse positioning and servo bursts for fine positioning.

Figure 3A:
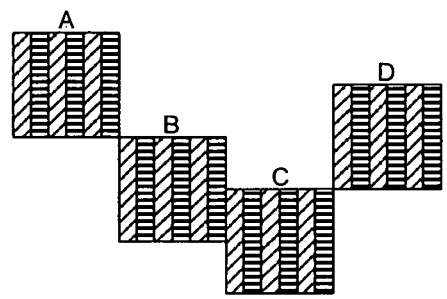
FIG. 3A shows an amplitude-based servo pattern wherein the amplitude signal for detecting head/disk contact is generated as the sum of the A+B+C+D servo bursts according to an embodiment of the present invention.

Any suitable servo burst pattern may be employed in the embodiments of the present invention. FIG. 3A shows an amplitude-based servo pattern comprising A, B, C and D servo bursts offset radially which define the tracks 18. Amplitude-based servo bursts are demodulated by detecting an amplitude of each servo burst (e.g., by integrating the read signal over each servo burst), and the PES generated by comparing the relative amplitudes. In one embodiment, the amplitude signal for detecting the head/disk contact is generated by summing the demodulated burst signals A+B+C+D.

Figure 3B:
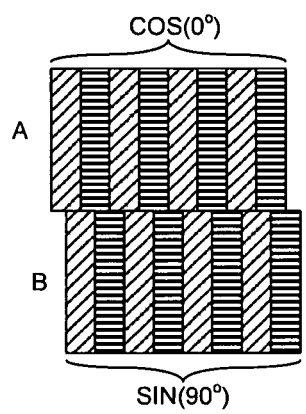
FIG. 3B shows a phase-based servo pattern wherein the amplitude signal for detecting head/disk contact is generated as the sum of the A+B servo bursts.

FIG. 3B shows an alternative embodiment wherein the tracks 18 are defined by a phase-based servo pattern. The servo bursts of a phase-based servo pattern are recorded with a relative phase offset. In the example of FIG. 3B, an A servo burst is recorded with a first phase (0 degrees) and a B servo burst is recorded with a second phase (90 degrees). The A servo burst is demodulated by computing the cosine component of the read signal, and the B servo burst is demodulated by computing the sine component of the read signal. In one embodiment, the amplitude signal for detecting the head/disk contact is generated by summing the demodulated burst signals A+B.

Figure 4:
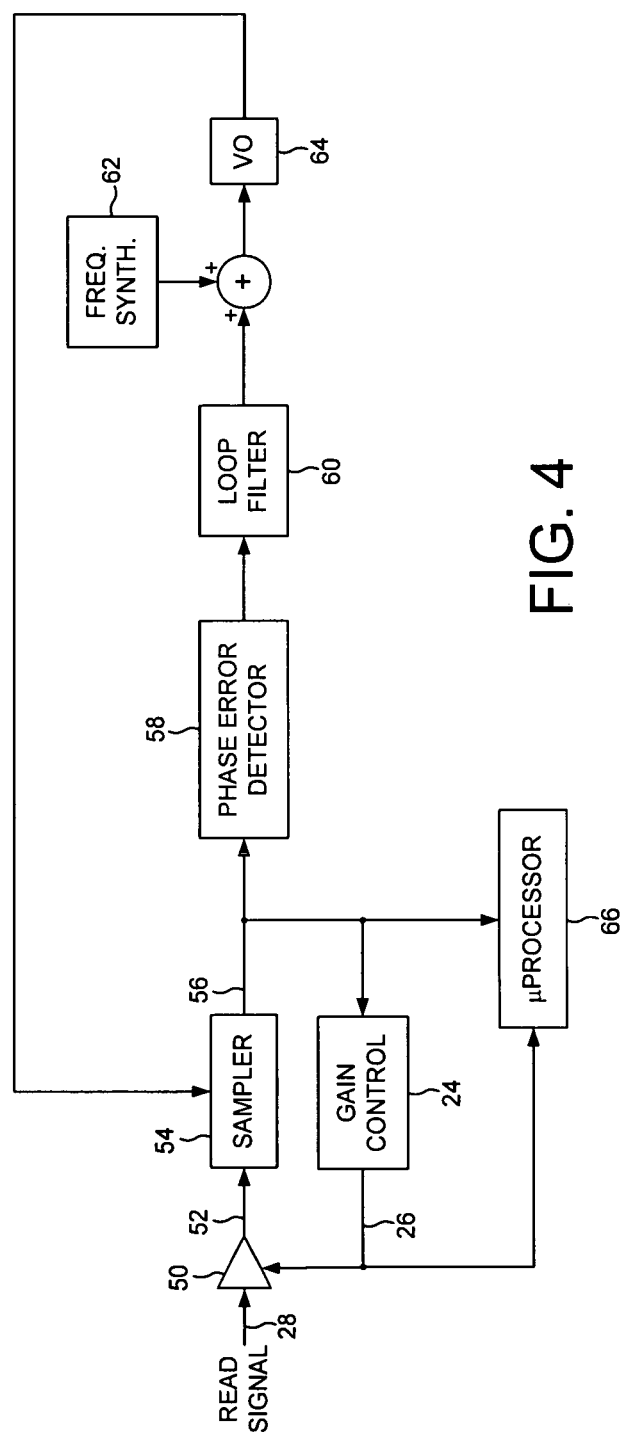
FIG. 4 shows control circuitry according to an embodiment of the present invention wherein the amplitude signal is generated as a gain control signal for adjusting the gain of the read signal.

FIG. 4 shows control circuitry according to an embodiment of the present invention. The read signal 28 is amplified by a variable gain amplifier 50, and the amplified read signal 52 sampled by a sampling device 54 (e.g., an A/D converter) to generate a sequence of read signal sample values 56. A gain control circuit 24 processes the sample values 56 to generate a gain control signal 26 used to adjust the variable gain amplifier 50. In one embodiment, the gain control circuit 24 adjusts the variable gain amplifier 50 so that the amplitude of the sample values match a target response, such as a suitable partial response (e.g., PR4, ERP4, etc.). In the embodiment of FIG. 4, a frequency of the sampling device 54 is adjusted using suitable timing recovery circuitry, which may include a phase error detector 58, a loop filter 60, a frequency synthesizer 62, and a variable oscillator 64. The timing recovery circuitry synchronizes the sampling frequency relative to a target response; however, other forms of timing recovery may be employed, such as interpolated timing recovery wherein the read signal is sampled asynchronously and the asynchronous samples interpolated to generate the synchronous samples.

In one embodiment, the gain control signal 26 is the amplitude signal for detecting head/disk contact since the gain control signal 26 is an indication of the read signal amplitude. In the embodiment of FIG. 4, a microprocessor 66 processes the gain control signal 26 to generate the amplitude variance signal, such as the variance of the gain control signal 26 or a variance of a non-repeatable component.

Figure 5:
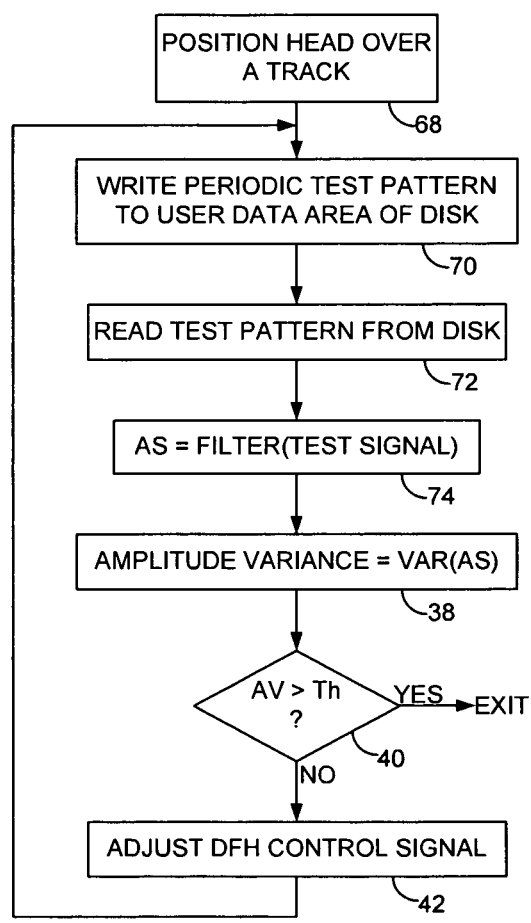
FIG. 5 is a flow diagram according to an embodiment of the present invention wherein the amplitude signal is generated by reading a test pattern from the disk.

FIG. 5 is a flow diagram according to an embodiment of the present invention which expands on the flow diagram of FIG. 2B, wherein the amplitude signal is generated by writing and reading a test pattern to the disk. The head is positioned over a track (step 68) and a test pattern is written to a user data area of the disk (step 70), such as a data sector or a data wedge (area between servo sectors). Any suitable test pattern may be written, such as a periodic pattern (e.g., a 2T pattern). The test pattern is read from the disk (step 72), and the amplitude signal generated by filtering the read signal to extract a suitable frequency component (step 74), such as the fundamental frequency.

Figure 6:
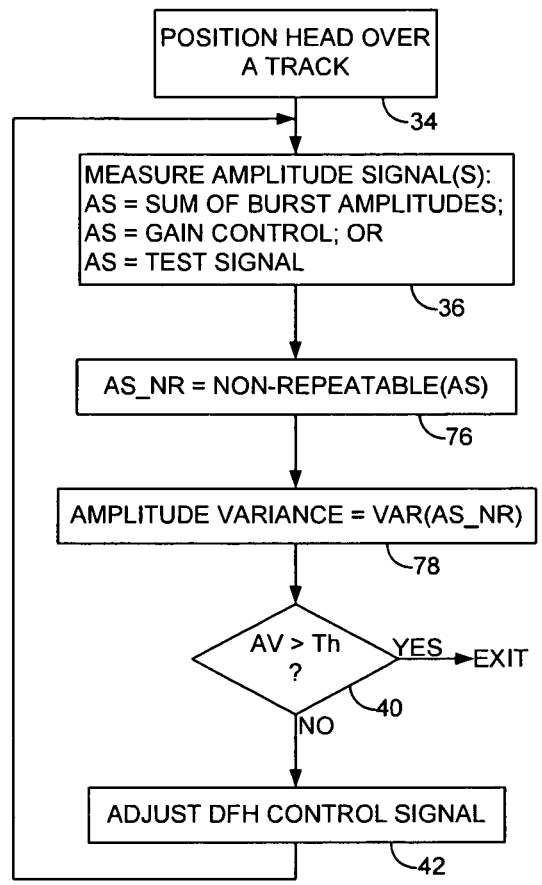
FIG. 6 is a flow diagram according to an embodiment of the present invention wherein the amplitude variance signal is generated as a variance of a non-repeatable component of the amplitude signal.

FIG. 6 is a flow diagram according to an embodiment which expands on the flow diagram of FIG. 2B, wherein a non-repeatable amplitude signal is computed by extracting a non-repeatable component from the amplitude signal (step 76). In one embodiment, the non-repeatable component is generated as a difference between amplitude signal values over at least two revolutions of the disk. For example, the non-repeatable component may be generated by measuring a first amplitude signal value at a first servo sector during a first revolution of the disk, measuring a second amplitude signal value at the first servo sector during a second revolution of the disk, and computing a difference between the first and second amplitude signal values. In one embodiment, the non-repeatable component may be generated over more than two disk revolutions. The amplitude variance signal is then computed as a variance of the non-repeatable amplitude signal (step 78). Computing the variance of the non-repeatable amplitude signal may improve the accuracy of detecting the head/disk contact.

Figure 7:
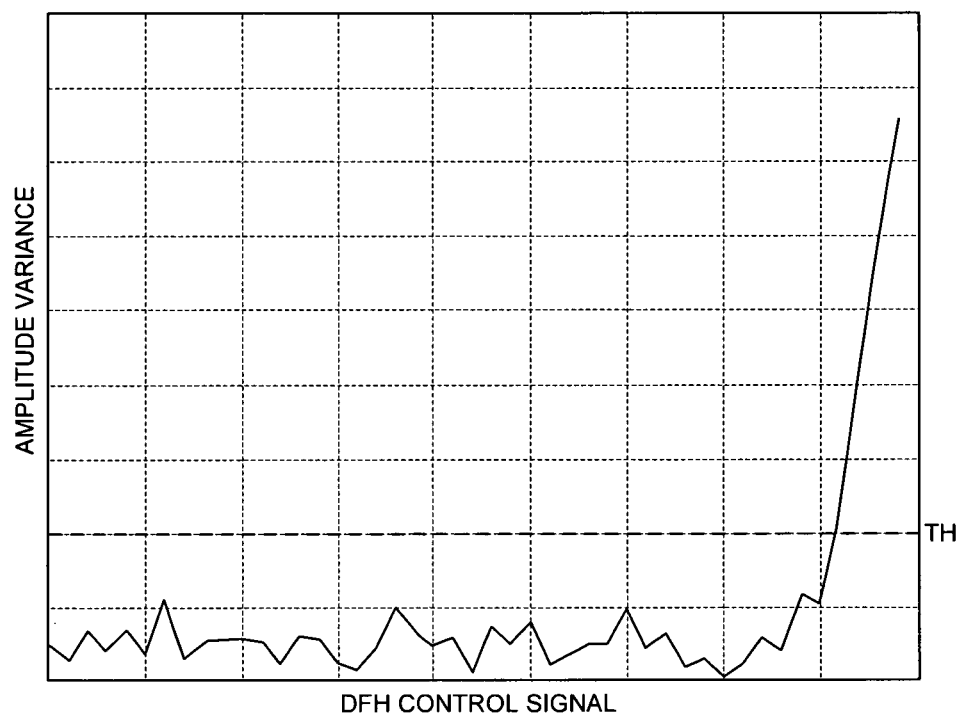
FIG. 7 illustrates an embodiment of the present invention wherein a head/disk contact is detected when the amplitude variance signal exceeds a threshold.

FIG. 7 shows an example plot of the amplitude variance signal versus the DFH control signal. As the DFH control signal increases, the head eventually contacts the disk causing the amplitude variance signal to exceed a predetermined threshold. In one embodiment, the threshold is selected high enough to avoid false detections due to noise in the amplitude variance signal, and low enough to ensure a proper DFH operating setting is selected to achieve the desired fly height as well as to prevent damaging the head due to extended head/disk contact. In one embodiment, a mean and standard deviation are computed for the amplitude variance signal, and then the threshold is selected by adding a multiple of the standard deviation to the mean. In one embodiment, a nominal threshold may be selected for a family of disk drives, and in another embodiment, the threshold may be selected (or tuned) for each individual disk drive.

Figure 1:
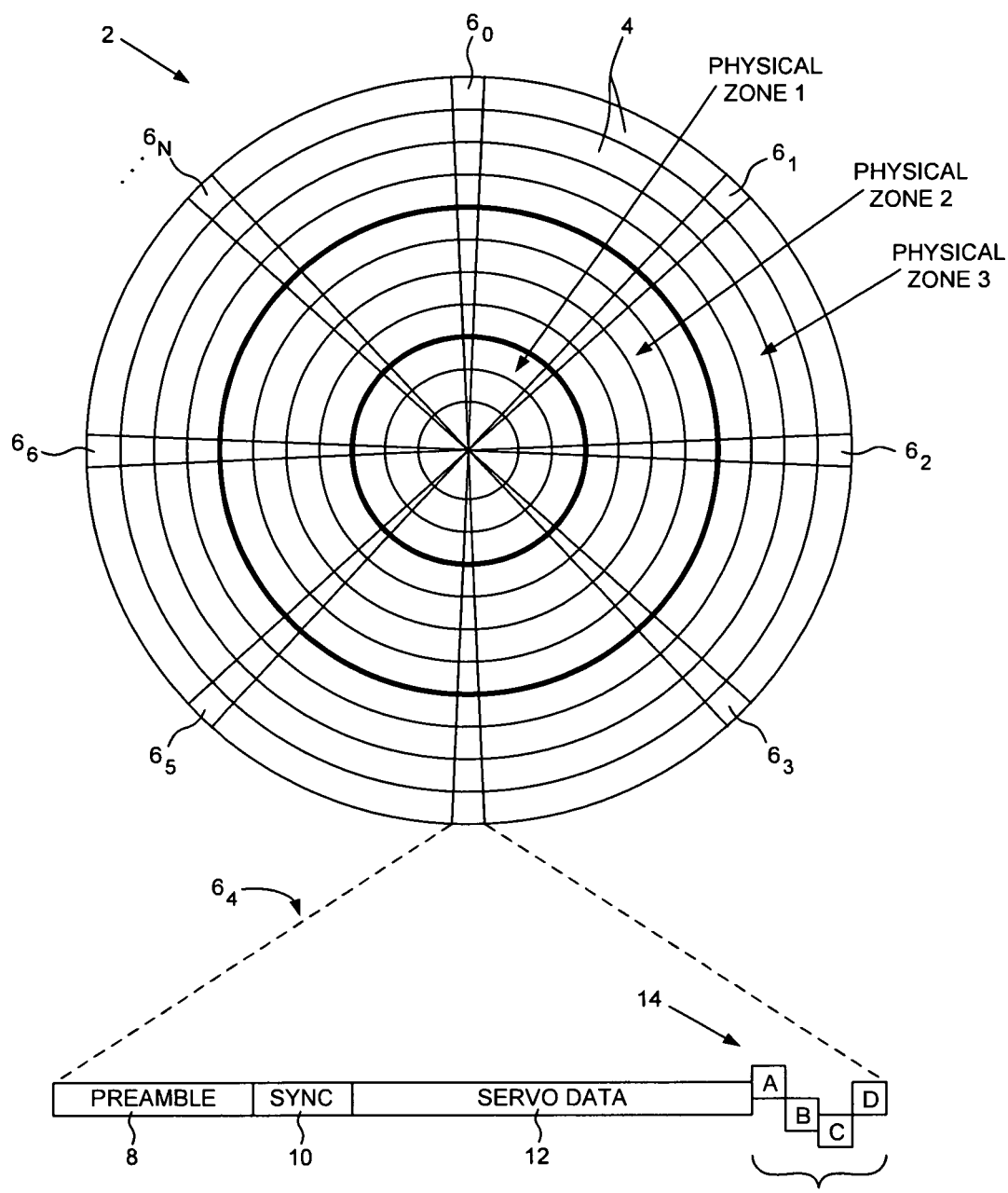
FIG. 1 shows a prior art disk format comprising a plurality of embedded servo sectors for defining a number of data tracks, wherein the data tracks are banded together to form a plurality of physical zones.

In one embodiment, an operating control signal may be determined for the DFH actuator at multiple locations over the radius of the disk. For example, an operating control signal may be determined for each physical zone of the disk (FIG. 1). During normal operation, when the head seeks across physical zones, the operating control signal is updated accordingly.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of tracks, wherein each track comprises a plurality of data sectors and a plurality of servo sectors, wherein each servo sector comprises a plurality of servo bursts;
   a head actuated radially over the disk, wherein the head comprises a dynamic fly height (DFH) actuator;
   a gain control circuit operable to generate a gain control signal for adjusting an amplitude of a read signal emanating from the head; and
   control circuitry operable to select an operating control signal applied to the DFH actuator by:
      positioning the head over one of the tracks;
      measuring an amplitude signal in response to the read signal, wherein the amplitude signal comprises at least one of:
         a sum of at least two of the servo bursts when the head reads a servo sector from the disk;
         the gain control signal when the head reads data from the disk; and
         an amplitude of the read signal when the head reads a test pattern from the disk;
      computing an amplitude variance signal in response to the amplitude signal; and
      detecting whether the head has contacted the disk in response to the amplitude variance signal,
      wherein the amplitude variance signal is based on a mean of the amplitude signal.

2. The disk drive as recited in claim 1, wherein the control circuitry is further operable to compute the amplitude variance signal as a variance of the amplitude signal.

3. The disk drive as recited in claim 1, wherein the control circuitry is further operable to detect whether the head has contacted the disk by comparing the amplitude variance signal to a threshold.

4. The disk drive as recited in claim 3, wherein the control circuitry is further operable to adjust the control signal applied to the DFH actuator when the amplitude variance signal does not exceed the threshold.

5. The disk drive as recited in claim 1, wherein:
   the servo bursts comprise radially offset A, B, C and D servo bursts; and
   the amplitude signal comprises A+B+C+D.

6. The disk drive as recited in claim 1, wherein:
   the servo bursts comprise a first phase servo burst A and a second phase servo burst B; and
   the amplitude signal comprises A+B.

7. The disk drive as recited in claim 1, wherein the control circuitry is further operable to write the test pattern to the disk.

8. The disk drive as recited in claim 1, wherein the test pattern comprises a periodic signal.

9. The disk drive as recited in claim 1, wherein the control circuitry is further operable to filter the read signal to extract a frequency component from the read signal when reading the test pattern from the disk.

10. The disk drive as recited in claim 1, wherein the control circuitry is further operable to:
    compute a non-repeatable amplitude signal by extracting a non-repeatable component from the amplitude signal; and
    compute the amplitude variance signal as a variance of the non-repeatable amplitude signal.

11. A method of operating a disk drive, the disk drive comprising:
    a disk comprising a plurality of tracks, wherein each track comprises a plurality of data sectors and a plurality of servo sectors, wherein each servo sector comprises a plurality of servo bursts;
    a head actuated radially over the disk, wherein the head comprises a dynamic fly height (DFH) actuator; and
    a gain control circuit operable to generate a gain control signal for adjusting an amplitude of a read signal emanating from the head;
    the method comprising:
       positioning the head over one of the tracks;
       measuring an amplitude signal in response to the read signal, wherein the amplitude signal comprises at least one of:
          a sum of at least two of the servo bursts when the head reads a servo sector from the disk;
          the gain control signal when the head reads data from the disk; and
          an amplitude of the read signal when the head reads a test pattern from the disk;
       computing an amplitude variance signal in response to the amplitude signal; and
       detecting whether the head has contacted the disk in response to the amplitude variance signal,
       wherein the amplitude variance signal is based on a mean of the amplitude signal.

12. The method as recited in claim 11, wherein computing the amplitude variance signal comprises computing a variance of the amplitude signal.

13. The method as recited in claim 11, wherein detecting whether the head has contacted the disk comprises comparing the amplitude variance signal to a threshold.

14. The method as recited in claim 13, further comprising adjusting the control signal applied to the DFH actuator when the amplitude variance signal does not exceed the threshold.

15. The method as recited in claim 11, wherein:
    the servo bursts comprise radially offset A, B, C and D servo bursts; and
    the amplitude signal comprises A+B+C+D.

16. The method as recited in claim 11, wherein:
    the servo bursts comprise a first phase servo burst A and a second phase servo burst B; and
    the amplitude signal comprises A+B.

17. The method as recited in claim 11, further comprising writing the test pattern to the disk.

18. The method as recited in claim 11, wherein the test pattern comprises a periodic signal.

19. The method as recited in claim 11, further comprising filtering the read signal to extract a frequency component from the read signal when reading the test pattern from the disk.

20. The method as recited in claim 11, further comprising computing a non-repeatable amplitude signal by extracting a non-repeatable component from the amplitude signal, wherein computing the amplitude variance signal comprises computing a variance of the non-repeatable amplitude signal.

21. A disk drive comprising:
- a disk comprising a plurality of tracks, wherein each track comprises a plurality of data sectors and a plurality of servo sectors, wherein each servo sector comprises a plurality of servo bursts;
- a head actuated radially over the disk, wherein the head comprises a dynamic fly height (DFH) actuator;
- a gain control circuit operable to generate a gain control signal for adjusting an amplitude of a read signal emanating from the head; and
- control circuitry operable to select an operating control signal applied to the DFH actuator by:
    - positioning the head over one of the tracks;
    - measuring an amplitude signal in response to the read signal, wherein the amplitude signal comprises a sum of at least two of the servo bursts when the head reads a servo sector from the disk;
    - computing an amplitude variance signal in response to the amplitude signal; and
    - detecting whether the head has contacted the disk in response to the amplitude variance signal,
  wherein:
    - the servo bursts comprise radially offset A, B, C and D servo bursts; and
    - the amplitude signal comprises A+B+C+D.

22. A disk drive comprising:
- a disk comprising a plurality of tracks, wherein each track comprises a plurality of data sectors and a plurality of servo sectors, wherein each servo sector comprises a plurality of servo bursts;
- a head actuated radially over the disk, wherein the head comprises a dynamic fly height (DFH) actuator;
- a gain control circuit operable to generate a gain control signal for adjusting an amplitude of a read signal emanating from the head; and
- control circuitry operable to select an operating control signal applied to the DFH actuator by:
    - positioning the head over one of the tracks;
    - measuring an amplitude signal in response to the read signal, wherein the amplitude signal comprises a sum of at least two of the servo bursts when the head reads a servo sector from the disk;
    - computing an amplitude variance signal in response to the amplitude signal; and
    - detecting whether the head has contacted the disk in response to the amplitude variance signal,
  wherein:
    - the servo bursts comprise a first phase servo burst A and a second phase servo burst B; and
    - the amplitude signal comprises A+B.

23. A method of operating a disk drive, the disk drive comprising:
- a disk comprising a plurality of tracks, wherein each track comprises a plurality of data sectors and a plurality of servo sectors, wherein each servo sector comprises a plurality of servo bursts;
- a head actuated radially over the disk, wherein the head comprises a dynamic fly height (DFH) actuator; and
- a gain control circuit operable to generate a gain control signal for adjusting an amplitude of a read signal emanating from the head;

the method comprising:
- positioning the head over one of the tracks;
- measuring an amplitude signal in response to the read signal, wherein the amplitude signal comprises a sum of at least two of the servo bursts when the head reads a servo sector from the disk;
- computing an amplitude variance signal in response to the amplitude signal; and
- detecting whether the head has contacted the disk in response to the amplitude variance signal, wherein:
- the servo bursts comprise radially offset A, B, C and D servo bursts; and
- the amplitude signal comprises A+B+C+D.

24. A method of operating a disk drive, the disk drive comprising:
- a disk comprising a plurality of tracks, wherein each track comprises a plurality of data sectors and a plurality of servo sectors, wherein each servo sector comprises a plurality of servo bursts;
- a head actuated radially over the disk, wherein the head comprises a dynamic fly height (DFH) actuator; and
- a gain control circuit operable to generate a gain control signal for adjusting an amplitude of a read signal emanating from the head;

the method comprising:
- positioning the head over one of the tracks;
- measuring an amplitude signal in response to the read signal, wherein the amplitude signal comprises a sum of at least two of the servo bursts when the head reads a servo sector from the disk;
- computing an amplitude variance signal in response to the amplitude signal; and
- detecting whether the head has contacted the disk in response to the amplitude variance signal, wherein:
- the servo bursts comprise a first phase servo burst A and a second phase servo burst B; and
- the amplitude signal comprises A+B.

* * * * *